United States Patent [19]

Roch

[11] 3,812,695
[45] May 28, 1974

[54] BACK GAUGE FOR PRESS BRAKE
[75] Inventor: Gerald V. Roch, New Augusta, Ind.
[73] Assignee: Hurco Manufacturing Company, Inc., Indianapolis, Ind.
[22] Filed: June 21, 1972
[21] Appl. No.: 264,867

Related U.S. Application Data
[63] Continuation of Ser. No. 41,138, May 25, 1970, abandoned.

[52] U.S. Cl. .................................. 72/36, 72/461
[51] Int. Cl. .......................................... B21d 43/26
[58] Field of Search ............... 72/36, 461, DIG. 21; 83/467; 269/318

[56] References Cited
UNITED STATES PATENTS

| 784,726 | 3/1905 | Yates | 72/DIG. 21 |
|---|---|---|---|
| 1,366,409 | 1/1921 | Munschauer | 269/318 |
| 2,426,446 | 8/1947 | Funk | 72/DIG. 21 |
| 2,510,768 | 6/1950 | Williamson | 72/DIG. 21 |
| 2,669,276 | 2/1954 | Humphrey | 72/DIG. 21 |
| 2,924,260 | 2/1960 | Guarino | 72/DIG. 21 |
| 3,115,801 | 12/1963 | Pearson et al. | 83/467 |
| 3,176,559 | 4/1965 | Kootz | 83/467 |
| 3,421,359 | 1/1969 | Gibbs | 72/DIG. 21 |

Primary Examiner—Charles W. Lanham
Assistant Examiner—M. J. Keenan
Attorney, Agent, or Firm—Woodard, Weikart, Emhardt & Naughton

[57] ABSTRACT

A pair of horizontally spaced supports behind a press brake bed holds an elongated gauge bar adjacent the press brake dies. The gauge bar is pivotally mounted to the supports and suitably counter-balanced to permit upward pivoting for clearance of return flanges formed in the stock. Pivoted gauge fingers can be quickly secured to the gauge bar at any point and are pivotable upwardly to clear return flanges, the pivots being spring-loaded detents facilitating choice of orientation of finger gauge face.

24 Claims, 9 Drawing Figures

INVENTOR
GERALD V. ROCH
BY
Woodard, Weikart, Emhardt & Naughton
ATTORNEYS

INVENTOR
GERALD V. ROCH 3,812,695

BACK GAUGE FOR PRESS BRAKE

CROSS REFERENCE TO RELATED APPLICATION

This is a continuation of my co-pending application Ser. No. 41,138, filed May 25, 1970 entitled BACK GAUGE FOR PRESS BRAKE, now abandoned.

BACKGROUND OF THE INVENTION

1. Field of the Invention

This invention relates generally to press brakes, and more particularly to back gauges therefor, and provides for a back gauge counter-balanced and pivotable upwardly to clear return flanges, with provision for attachment of upwardly pivotable gauge fingers thereto.

2. Description of the Prior Art

Typical prior art back gauges are secured to the press brake bed in some manner, and some are adjustable. Generally speaking, however, they are inconvenient to use and of limited versatility.

SUMMARY OF THE INVENTION

Described briefly, in a typical embodiment of the present invention, the bed of a forming machine has a pair of horizontally spaced supports mounted thereon. A gauge bar is pivotally mounted to the supports by a pair of connectors, the gauge bar being counter-balanced with respect to the pivot axis, facilitating elevation of the gauge face thereof by a return flange on stock being formed in the machine. The gauging fingers may be mounted to the gauge bar and are pivotable in detents accommodating elevation thereof by return flanges on the stock being formed, the pivots also serving to accommodate selection or orientation of the gauge faces on the ends of the fingers.

DESCRIPTION OF THE PREFERRED EMBODIMENT

Figure 1:
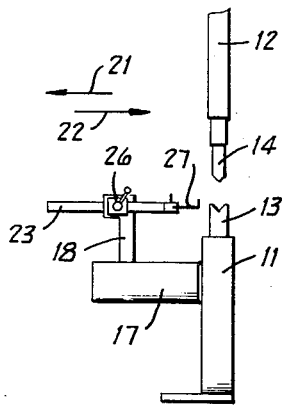
FIG. 1 is a schematic side elevational view of a portion of a press brake with the back gauges thereon according to a typical embodiment of the present invention.

Referring now to FIG. 1, a press brake having a bed 11 and ram 12 with appropriate dies 13 and 14, has a pair of gauge drive units 16 and 17 mounted thereto. These drive units include therein means for driving the pedestals 18 and 19 back and forth in the direction of arrows 21 and 22, respectively. These drive assemblies and pedestals are available from the Hurco Manufacturing Company, Inc. of 6602 Guion Rd., Indianapolis, Ind. 46268.

A horizontal support bar 23 is provided at the top of the pedestal 18, as is support bar 24 provided at the top of pedestal 19. Support bar 23 is horizontally slidable in the direction of arrows 21 and 22 in a groove in the pedestal 18, and is normally affixed in a desired position in the groove by operation of the hand clamp handle 26. The same arrangement is provided for support bar 24.

A gauge bar 27 is pivotably mounted to the support bars 23 and 24 by a pair of connectors 28 and 29. Generally speaking, the gauge bar is of channel-shaped cross section in the portion between the support bars, with the front flange 31 thereof extending beyond the channel portion throughout the length of the gauge bar from the end 32 to the end 33. The front face 34 thereof serves as a gauging face and, in addition to being flat, is of ample diminsion from the top margin 36 thereof to the lower margin 37 thereof, this being typically 1 inch.

Figure 5:
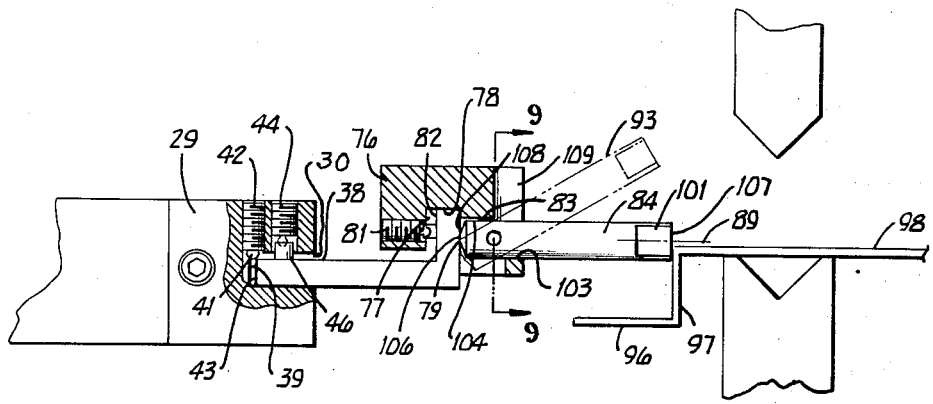
FIG. 5 is a side elevational view showing fingers mounted to the gauge bar, portions being shown in section to illustrate some interior details.

Some details of mounting of the gauge bar to the connectors, and in the mounting of the connectors to the support bars, are significant. For example, as shown in FIG. 5, connector 29 has a horizontally extending slot 30 in the front face thereof, and the gauge bar portion 38 received in this slot did not extend entirely to the back wall 39 of the slot, but is, instead, spaced therefrom by a spring-loaded ball plunger 41 housed in and disposed at the lower end of the screw 42 threadedly received in the connector 29. Such ball plungers are available from the Vlier Engineering Corporation, 8900 Santa Monica Blvd., Los Angeles, Calif. The gauge bar, with the rear margin 43 thereof spaced from the rear wall 39 of the slot by the ball plunger, is clamped to the bottom of the slot by another set screw 44 having a swivel pad 46 at the lower end thereof, these being available from the same source as the ball plungers. The same kind of connection is used between the gauge bar and the connector 28.

Figure 4:
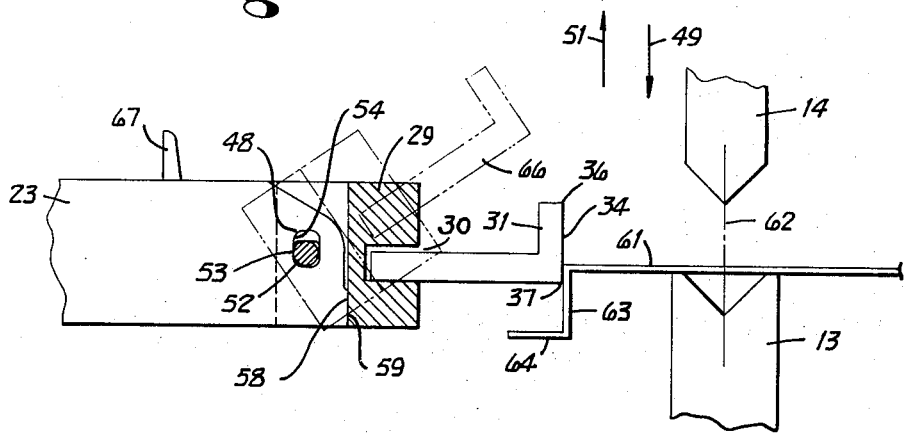
FIG. 4 is an enlarged side elevational view of the gauge bar support and showing a portion of the pivoted connector in section.
Figure 8:
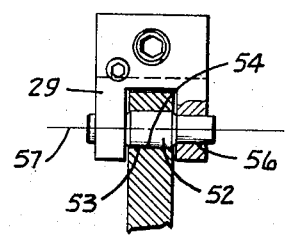
FIG. 8 is a top plan view of a gauge bar connector mounted on a horizontal support (shown in section) illustrating some mounting details, on the same scale as FIGS. 5 and 6.
Figure 9:
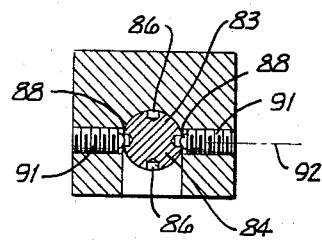
FIG. 9 is a section through a finger mounting clamp and finger taken at line 9—9 in FIG. 5 and viewed in the direction of the arrows.

The mounting of the connector brackets to the horizontel supports will be best understood upon reference to FIGS. 4 and 8. In FIG. 4, it will be observed that the support bar 23 has a slot 48 therein extending in a direction parallel to the directions 49 and 51 of movement of the press brake ram. A shaft 52 has a rectangular central portion (best shown in FIG. 8), the back face 53 of which is slidably engaged with the back face 54 of the slot. This shaft has cylindrical end portions 56 received in suitable cylindrical bearings in the connector 29. Accordingly, the connector is pivotal on the shaft axis 57, and the shaft is vertically slidable in the slot 48. The connector has a rear locating face 58 abuttingly engagable with a front locating face 59 of the support bar, this locating face being parallel to the direction of motion of the ram. Note also that the front face 34 of the gauge bar is in a plane parallel to the direction of motion of the ram.

With the gauge face 34 of the gauge bar, the locating faces 58 and 59 of the connector and support bar, respectively, in abutting relation, and all lying in planes parallel to the plane of motion of the ram, reliable gauging from the plane of the center 62 of the ram and bed dies to the gauging face 34, is assured.

The pivotal mounting of the gauge bar to the supports 23 and 24 permits upward pivoting of the gauge bar by a return flange of the stock (as at 63 or 64 in FIG. 4), such upward pivoting being indicated, for example, by the dotted line at 66 in FIG. 4. This pivoting is facilitated by the counter-balancing of the gauge bar, this being accomplished by the balancing portion 66 of the gauge bar projecting behind the pivot axis of the connectors and between the connectors, and which includes the upstanding flange 67 at the rear margin of the balancing portion. Accordingly there is just slightly less weight behind the pivot axis than there is ahead of the pivot axis, so that although a return flange on the stock can readily move the gauge bar up as the stock is formed, the gauge bar will return to its normal gauging attitude due to its own weight.

Figure 2:
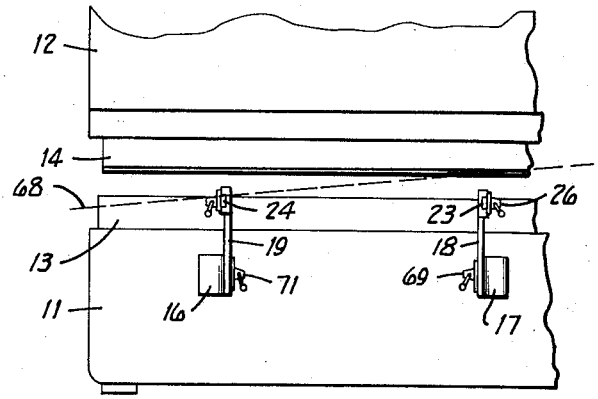
FIG. 2 is a rear elevational view thereof.

The vertical slots 48 in the support bars enable inclination of the connector shafts transversely in the bars, thus facilitating the raising of the pedestals, one-at-a-time, during set-up of the gauge, without binding. This is indicated by the dotted line 68 in FIG. 2 where, by releasing the hand clamp 69 connecting the pedestal 18 to the drive carriage inside the drive unit 17, the pedestal can be elevated to the extent desired. The same is true of the clamp 71 with respect to the pedestal 19. This simplifies the elevation of the gauge bar whenever desired for cooperation with different tooling or for any other reason.

Figure 3:
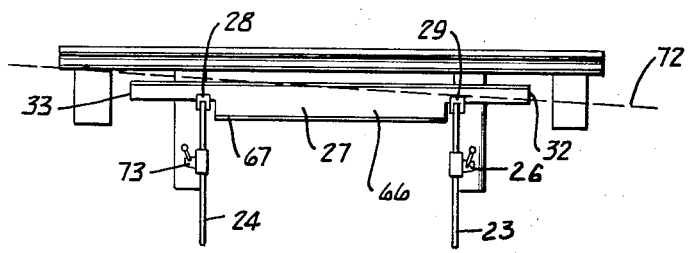
FIG. 3 is a top plan view thereof.

While the hand clamps are loosened, it is also possible to have a reasonable amount of skew between the support bars 23 and 24 as indicated by the dotted outline 72 in FIG. 3. In addition to the general looseness which can be effected by loosening the clamp 26 and clamp 73, it is possible also to loosen the swivel pad set screw in each of the connectors as at 44 in connector 29. The gauge bar can then squeeze under the ball plunger to the back of the slot to the extent needed to accommodate the amount of skew which may occur during adjustment. Although it is not generally desirable to move either of the support bars much out of line with the other, the above described features of the present invention provide tolerance for a reasonable amount of this as the gauge is set up. Of course it is important that the set-up be completed with the plane of the face 34 extending parallel to the plane of the dies. The support bars should be adjusted accordingly, and the swivel pad set screws can again be tightened.

A further point of interest in connection with the mounting of the gauge bar connectors to the support bars 23 and 24 is the fact that although upward pivoting as a result of the upward movement of the stock during forming can occur, the cooperation of the stop faces and their location with respect to the shaft axis assures stopping of the gauge bar upon subsequent descent, in an attitude useful for the desired subsequent gauging operation.

Referring now to FIGS. 5 through 9, a finger mounting clamp 76 includes a horizontally extending slot 77 received on the upturned front flange 31 of the gauge bar. The slot has a top wall 78 which rests upon the upper edge of the gauge bar flange, and the slot has a front wall 79 abuttingly engaging the gauge face 34 of the gauge bar. A set screw 81 with a swivel pad 82 on the front end thereof is threadedly received in the down turned rear flange of the clamps, the swivel pad engaging the rear surface of flange 31. The clamp is thus affixed to the front of the gauge bar.

The clamp includes an aperture 83 (FIGS. 5 and 9) through which the cylindrical body 84 of a gauging finger projects. The gauging finger has four detent holes 86 and 88 therein disposed on lines intersecting at right angles at the longitudinal axis 89 of the finger. Two ball plungers 91 are threadedly received in the clamp, the spring-loaded balls thereof projecting into the aperture 83 and received in the detent holes 88 of the gauging finger. These plungers provide a horizontal pivot axis 92 on which the finger can pivot upward to a position such as shown by the dotted outline 93 in FIG. 5 thus deflected by a return flange or flanges 96 and 97 of the stock 98 being formed.

Figure 6:
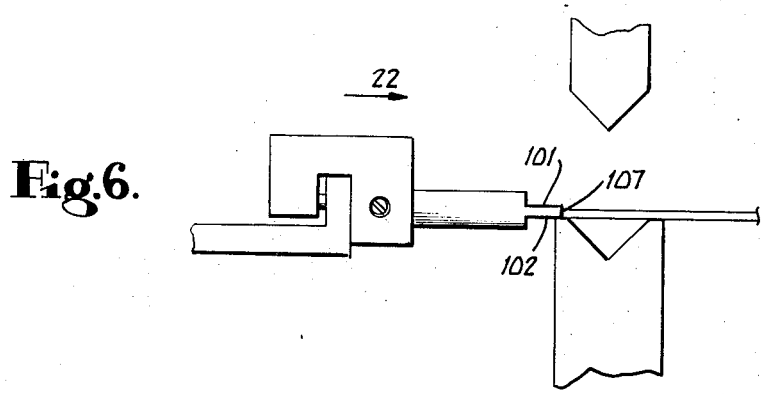
FIG. 6 is a fragmentary elevational view of a portion of FIG. 5, showing an alternate disposition of the gauge bar finger gauging face.
Figure 7:
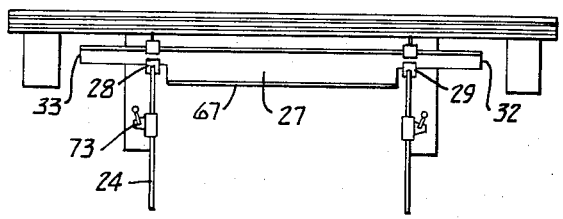
FIG. 7 is a top plan view on the same scale as FIG. 3 and showing gauge fingers on the gauge bar.

Although the body of the finger is cylindrical, the gauging end portion is flattened as best shown in FIGS. 5 and 6, at 101 and 102. It should be pointed out here, however, that the FIG. 6 illustration shows the finger rotated 90° on its axis 89 from the position in which it is shown in FIG. 5. The way this is accomplished is by manually gripping the gauging portion between the thumb and forfinger of the hand, the thumb resting on face 101, for example, and the forefinger resting on face 102, for example, and simply manually turning the finger on its axis 89. The cylindrical surface of the aperture 93 particularly in the support region 103 and 104, cooperating with the cylindrical body of the finger, facilitate maintaining the location of the rear portion of the finger as it is turned. The spring-loaded balls of the plungers 91 will simply be urged into retracted position out of detents 88 and will enter the detents 86 upon completion of the 90° turn. At the same time, the rear locating face 106 can rest upon the front gauging face 34 of the gauge bar thus assuring alignment of the detent holes 86 with the plunger ball upon completion of the 90° turn. In this way, the locating face 107 of the finger can be reoriented from a vertically extending comparatively narrow face to a horizontally extending comparatively narrow face. It is thereby well adapted to gauging for narrow flanges of the stock such as would occur when the stock is located as illustrated in FIG. 6. These gauging fingers can conveniently be used also for locating a bend with respect to corner notches in the stock, the gauging fingers being received in and engaging an end of a notch at each end of the stock for this purpose.

From the foregoing description, it should be apparent that the fingers can be made practically any length desired, and will provide suitable clearance for return flanges accordingly. The shallow taper 108 surrounding the comparatively small circular locating face 106 at the rear end of the gauging fingers, together with the ability of the detent ball to be urged outwardly to some extent as the fingers are elevated, and the vertically extending slot 109 in the front of the clamp 76, do accommodate and facilitate the vertical lifting and upward pivoting of the gauging fingers by the stock when needed. Once the gauges retract or the stock passes the fingers, they can again fall to the point of support on surfaces 103 ahead of the pivot axis 92 and 104 behind the pivot axis 92. Another feature of significance is the fact that although the fingers are adjustable, pivotable, and replaceable with longer or shorter fingers, the gauge dimension is between the front face 107 and the rear face 106 of the gauging finger, the latter abuttingly engaging the gauge face 34 of the gauge bar, rather than relying upon the ball plungers for any locating effect. The ball plungers will accommodate, without departing from the detents, whatever axial movement of the finger is needed to provide the solid gauging distance between the gauge bar face 34 and the finger gauge face 107. As suggested above, the fingers are replaceable. To do so, the gauging fingers can be removed from their respective clamps by simply turning them on their longitudinal axes to some position where the ball plungers are between the detents 86 and 88, and then simply pulling them forward out of the slots in the direction of arrow 22.

While the invention has been disclosed and described in some detail in the drawings and foregoing description, they are to be considered as illustrative and not restrictive in character, as other modifications may readily suggest themselves to persons skilled in this art and within the broad scope of the invention.

The invention claimed is:

1. In forming machinery having a base, stock forming means mounted to said base, and stock locating means mounted to said base for locating said stock with respect to said forming means, the improvement comprising:

first and second spaced supports;
first and second connectors pivotably mounted on horizontal axes respectively to said first and second supports;
a gauge bar extending between said connectors and connected to said connectors for pivoting about a common axis through said connectors;
stop means limiting pivoting of said connectors on said supports, for holding said gauge bar in a useful attitude with respect to said forming means;
said supports being horizontally spaced;
said common axis being generally horizontal;
and said gauge bar having front gauging face means thereon ahead of said axis and a rear, counterbalancing portion behind said axis whereby said gauge bar is generally balanced with respect to said axis, with the center of gravity of said gauge bar slightly ahead of said axis for reliable descent of the gauging face from an upwardly pivoted position to a position of the gauging face having said useful attitude.

2. In forming machinery having a base, stock forming means mounted to said base, and stock locating means mounted to said base for locating said stock with respect to said forming means, the improvement comprising:

first and second spaced supports;
first and second connectors pivotably mounted on horizontal axes respectively to said first and second supports;
a gauge bar extending between said connectors and connected to said connectors for pivoting about a common axis through said connectors;
stop means limiting pivoting of said connectors on said supports, for holding said gauge bar in a useful attitude with respect to said forming means;
each of said supports having a slot therein extending generally in the direction of movement of said forming means, and
each of said connectors having a bearing shaft rotatably mounted therein, said shaft being fittingly received in said slot and movable in said slot in the direction of extension of said slot, and inclinable in said slot,
whereby said connectors and supports accommodate elevation of one of said supports with respect to the other of said supports while said gauge bar is mounted to said connectors.

3. In forming machinery having a base, stock forming means mounted to said base, and stock locating means mounted to said base for locating said stock with respect to said forming means, the improvement comprising:

first and second spaced supports;
first and second connectors pivotably mounted on horizontal axes respectively to said first and second supports;
a gauge bar extending between said connectors and connected to said connectors for pivoting about a common axis through said connectors;
stop means limiting pivoting of said connectors on said supports, for holding said gauge bar in a useful attitude with respect to said forming means;
said forming means including longitudinally extending tools, one of said tools being movable toward the other, said gauge bar having a face extending parallel to said tools and lying in a plane parallel to the direction of motion of said one of said tools;
said stop means including abuttingly engaging faces of said connectors and said supports, said faces lying in a plane parallel to a plane containing said gauge bar face;
said supports having slots therein extending parallel to the said planes, and
said connectors having shafts fittingly mounted therein for rotation on said axis, said shafts having flat sided portions received in said slots and engaging walls of said slots parallel to said plane.

4. The improvement of claim 3 wherein:
said abuttingly engaging faces are disposed between said gauge bar face and an area of engagement of said flat sided portions with said slot walls.

5. In forming machinery having a base, stock forming means mounted to said base, and stock locating means mounted to said base for locating said stock with respect to said forming means, the improvement comprising:

first and second spaced supports;
first and second connectors pivotably mounted on horizontal axes respectively to said first and second supports;
a gauge bar extending between said connectors and connected to said connectors for pivoting about a common axis through said connectors;
stop means limiting pivoting of said connectors on said supports, for holding said gauge bar in a useful attitude with respect to said forming means;
said forming means including longitudinally extending tools, one of said tools being movable toward the other, said gauge bar having a face extending parallel to said tools and lying in a plane parallel to the direction of motion of said one of said tools;
said gauge bar face being one face of an upstanding flange on said gauge bar, said improvement further comprising:
first and second gauging fingers;
first and second finger mounting members mounted on said gauge bar, at least one of said mounting members being mounted on said flange and having a locating surface located against said gauge bar face;

said gauge bar being pivotable upward on said supports, and said fingers being pivotable upward on said gauge bar.

6. In forming machinery having a base, stock forming means mounted to said base, and stock locating means mounted to said base for locating said stock with respect to said forming means, the improvement comprising:

first and second spaced supports;

first and second connectors pivotably mounted on horizontal axes respectively to said first and second supports;

a gauge bar extending between said connectors and connected to said connectors for pivoting about a common axis through said connectors;

stop means limiting pivoting of said connectors on said supports, for holding said gauge bar in a useful attitude with respect to said forming means;

said forming means including longitudinally extending tools, one of said tools being movable toward the other, said gauge bar having a face extending parallel to said tools and lying in a plane parallel to the direction of motion of said one of said tools;

first and second gauging fingers;

first and second finger mounting members affixed to said gauge bar; and first pivotal mounting means in said first member pivotally retaining said first finger in said first finger mounting member.

7. The improvement of claim 6 wherein:

said pivotal mounting means include detenting members;

said first finger has a cylindrical body received in said first mounting member, said body having first and second pairs of detents therein, said detenting members being normally received in said detents of said first pair, said body being rotatable on its longitudinal axis to remove said detenting members from the detents of said first pair and receive said detenting members in the detents of said second pair.

8. The improvement of claim 7 wherein:

said first finger has an elongated stock facing edge and an intermediate portion between said body and said edge, the width of said edge being substantially less than the diameter of said body, the length of said edge being parallel to a line extending between the detents of said second pair, the detents of said first pair being disposed on a line intersecting said line between the detents of said second pair.

9. The improvement of claim 6 wherein:

said first mounting member has a stop surface;

said first finger has an elongated body with a locating face and a stop face facing in opposite directions and spaced from each other;

said pivotal mounting means includes detenting members;

said first finger has detents therein receiving said detenting members; and said stop face is closely spaced from said stop surface to permit engagement therebetween without dislodgement of said detenting members from said detents.

10. The improvement of claim 9 wherein:

said detenting members include spring-loaded balls received in said detents, the ball loading and degree of detenting permitting manual rotation of said finger on axis of said body thereof without tools.

11. The improvement of claim 9 wherein:

said detents are located near said stop face;

said first mounting member has a limit surface associated with said detenting members and the body of said first finger to limit pivoting of said first finger on the axis of said detenting members at a point disposing said locating face adjacent said forming means.

12. A gauging device comprising:

a clamping member;

a gauging finger having a stock locating surface lying in a first vertical plane;

pivotal mounting means pivotally retaining said gauging finger in said clamping member and oriented for enabling movement of said stock locating surface in a generally vertical curved path away from said first plane;

said mounting means accommodating rotation of said finger in said clamping member about a first axis perpendicular to said first plane;

said pivotal mounting means include detenting members;

said finger including a body having detent means receiving said detenting members therein;

said detenting members being removable from said detent means by rotating said finger about said first axis.

13. The device of claim 12 wherein:

at least one of said detenting members is a spring-loaded ball.

14. The device of claim 12 wherein:

said detenting members received in said detents establish a second axis parallel to said plane, facilitating pivoting of said finger away from said first plane.

15. The device of claim 12 wherein:

said detent means include first and second pairs of detents, said first pair being disposed along a first line, and said second pair being disposed along a second line extending in a direction different from said first pair;

said detenting members being received in said detents of said first pair, and receivable in said detents of said second pair upon rotation of said finger about said first axis.

16. The device of claim 15 wherein:

said first and second lines are disposed in second and third planes perpendicular to each other.

17. The device of claim 16 wherein: comprising:

said locating surface is elongated in a direction perpendicular to one of said second and third planes.

18. The device of claim 12 wherein:

said clamping member has a stop surface therein;

said finger has a locating face closely spaced from a plane containing said stop surface of said clamping member accommodating coincidence of said finger locating face and the said plane containing said stop surface without removal of said detenting members from said detent means.

19. A gauging device comprising:

a clamping member;

a gauging finger having a stock locating surface lying in a first vertical plane;

pivotal mounting means pivotally retaining said gauging finger in said clamping member and oriented for enabling movement of said stock locating surface in a generally vertical curved path away from said first plane;

said mounting means accommodating rotation of said finger in said clamping member about a first axis perpendicular to said first plane;

an elongated gauge rail, having a gauge surface thereon;

said clamping member having a groove therein received on said rail, said groove having a locating surface on one wall thereof engaging said gauge surface of said gauge rail, said clamping member being affixed to said rail in one position along the length thereof, and releasable from said rail and movable along said rail to any other desired position along the length thereof.

20. The device of claim 19 and further comrpsing:
a support bar;
said gauge rail being pivotally mounted to said support bar for pivoting upwardly on a generally horizontal axis.

21. The device of claim 20 and further comprising:

a horizontal shaft pivotally connected to said gauge rail and vertically slidable in a slot in said support bar, said shaft having a flat face engaging a flat side of said slot.

22. In machinery having a base, stock treating means mounted to said base, and stock locating means mounted to said base for locating said stock with respect to said treating means, the improvement comprising:

support means;
an elongated gauge bar pivotally mounted to said support means to pivot on a horizontal axis.
said gauge bar having a gauging face extending parallel to said horizontal pivot axis and movable in a generally vertical curved path about said axis upon pivoting of said gauge bar;
stop means limiting movement of said gauge bar in said path, and normally maintaining said gauge bar gauging face in an attitude useful for positioning stock with reference to said treating means
said gauging face being in front of said axis, and said gauge bar having a counterbalancing portion behind said axis, whereby said gauge bar is generally balanced with respect to said axis, with the center of gravity of said gauge bar slightly offset from said axis in a direction providing reliable return of the pivoted gauge bar toward said stop means.

23. In machinery having a base, stock treating means mounted to said base, and stock locating means mounted to said base for locating said stock with respect to said treating means, the improvement comprising:

support means;
an elongated gauge bar pivotally mounted to said support means to pivot on a horizontal axis,
said gauge bar having a gauging face extending parallel to said horizontal pivot axis and movable in a generally vertical curved path about said axis upon pivoting of said gauge bar;
a pair of gauging fingers pivotally mounted on said gauge bar for pivoting with respect to said gauge bar about horizontal axes, and having stock locating surfaces thereon movable in a generally vertical curved path with respect to said gauge bar about the respective horizontal axes of said fingers upon pivoting of said fingers.

24. A gauging device comprising:
a gauge bar having a horizontally extending gauging face thereon in a vertical plane;
a clamping member clamped to said bar in one position; and
a first gauging finger mounted to said clamping member and having a stock locating surface horizontally spaced from said gauging face of said gauge bar;
a second clamping member clamped to said bar in a position horizontally spaced from said one position;
a second gauging finger mounted to said second clamping member, and having a stock locating surface horizontally spaced from said gauging face of said gauge bar,
said clamping members being releasable from said bar and movable horizontally for reclamping thereto in different horizontal spacing from each other,
said fingers being parallel to each other;
said fingers are pivotally mounted to said clamping members; and
each of said fingers has a finger locating surface abuttingly engaging said gauging face of said gauge bar at one end of a line which is perpendicular to the gauging face of said gauge bar and is perpendicular to and intercepts said stock locating surface of said finger.

* * * * *